(12) United States Patent
Warner (10) Patent No.: US 9,965,173 B2
(45) Date of Patent: May 8, 2018

(54) APPARATUS AND METHOD FOR PRECISE MULTI-TOUCH INPUT

(71) Applicant: Samsung Electronics Co., Ltd., Suwon-si, Gyeonggi-do (KR)

(72) Inventor: Lynn Andrew Warner, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 14/621,898

(22) Filed: Feb. 13, 2015

(65) Prior Publication Data
US 2016/0239173 A1    Aug. 18, 2016

(51) Int. Cl.
*G06F 3/041* (2006.01)
*G06F 3/0488* (2013.01)

(52) U.S. Cl.
CPC .......... *G06F 3/04883* (2013.01); *G06F 3/041* (2013.01); *G06F 2203/04104* (2013.01); *G06F 2203/04808* (2013.01)

(58) Field of Classification Search
CPC .... G06F 3/0488; G06F 3/0416; G06F 3/0412; G06F 3/04886; G06F 2203/04104; G06F 2203/04808
See application file for complete search history.

(56) References Cited

U.S. PATENT DOCUMENTS

| | | | |
|---|---|---|---|
| 5,187,776 A | 2/1993 | Yanker | |
| 5,615,384 A | 3/1997 | Allard et al. | |
| 6,459,424 B1 | 10/2002 | Resman | |
| 8,077,153 B2 | 12/2011 | Benko et al. | |
| 8,314,775 B2 | 11/2012 | Westerman et al. | |
| 2007/0247435 A1* | 10/2007 | Benko ................... | G06F 3/0488 345/173 |
| 2010/0053111 A1* | 3/2010 | Karlsson ............. | G06F 3/04883 345/174 |
| 2010/0245267 A1* | 9/2010 | Min .................... | G06F 3/04883 345/173 |
| 2011/0018806 A1 | 1/2011 | Yano | |
| 2011/0069018 A1 | 3/2011 | Atkins et al. | |
| 2011/0234503 A1 | 9/2011 | Fitzmaurice et al. | |
| 2012/0007854 A1* | 1/2012 | Cho ..................... | G06F 3/04815 345/419 |
| 2012/0151401 A1 | 6/2012 | Hwang | |
| 2012/0242581 A1* | 9/2012 | Laubach ............. | G06F 3/04812 345/168 |
| 2013/0135228 A1 | 5/2013 | Won et al. | |

(Continued)

FOREIGN PATENT DOCUMENTS

| | | |
|---|---|---|
| KR | 10-2012-0007574 A | 1/2012 |
| KR | 10-2012-0010525 A | 2/2012 |
| WO | 2013/031134 A1 | 3/2013 |

*Primary Examiner* — Ibrahim A Khan
(74) *Attorney, Agent, or Firm* — Jefferson IP Law, LLP (57) ABSTRACT

An apparatus and method for precise multi-touch input are provided. The method includes detecting a first touch input at a first location on a touchscreen; while the first touch input is maintained, detecting a second touch input at a second location on the touchscreen; detecting removal of the first touch input at the first location while the second touch input is maintained; and adjusting the first location according to movement of the second touch input, such that movement of the adjusted location is less than the movement of the second touch input.

23 Claims, 6 Drawing Sheets

(56) References Cited

U.S. PATENT DOCUMENTS

| | | |
|---|---|---|
| 2014/0035946 A1 | 2/2014 | Chang et al. |
| 2014/0078092 A1* | 3/2014 | Fyke ................... G06F 3/04883 345/173 |
| 2014/0109017 A1 | 4/2014 | Benko et al. |
| 2015/0338943 A1* | 11/2015 | Donnelly ................ G06F 3/041 345/173 |

* cited by examiner

APPARATUS AND METHOD FOR PRECISE MULTI-TOUCH INPUT

TECHNICAL FIELD

The present disclosure relates to an apparatus and method for touch input. More particularly, the present disclosure relates to an apparatus and method for performing precise multi-touch input.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile terminals are often provided with a touchscreen for user input. Touchscreens allow a user to select and manipulate user interface elements by touching, tapping, dragging, or other touch input functions. In most situations, these gestures are a good substitute for other input devices, such as a mouse and keyboard.

However, touchscreens are not well equipped for applications needing precise input, such as photo editing, Computer Assisted Drafting (CAD) programs, and the like. Most touchscreens use a finger or a stylus as an input device, and these input mechanisms lack the precision of, for example, a computer mouse. To address these issues, devices employing touchscreens provide the user with the ability to zoom in and out of a diagram or image to permit greater accuracy. However, this process of zooming in and out can be time-consuming and cumbersome. Accordingly, there is a need for a more accurate user input technique for touchscreens.

SUMMARY

Aspects of the present disclosure are to address at least the above-mentioned problems and/or disadvantages and to provide at least the advantages described below. Accordingly, an aspect of the present disclosure is to provide an apparatus and method for precise multi-touch input.

In accordance with an aspect of the present disclosure, a method for precise multi-touch input is provided. The method includes detecting a first touch input at a first location on a touchscreen, while the first touch input is maintained, detecting a second touch input at a second location on the touchscreen, detecting removal of the first touch input at the first location while the second touch input is maintained, and adjusting the first location according to movement of the second touch input, such that movement of the adjusted location is less than the movement of the second touch input.

In accordance with another aspect of the present disclosure, an apparatus configured to provide a precise multi-touch input is provided. The apparatus includes a display unit, a touchscreen operatively coupled to the display unit and configured to detect a touch, and a processor configured to detect a first touch input at a first location on the touchscreen, to detect a second touch input at a second location on the touchscreen while the first touch input is maintained, to detect removal of the first touch input at the first location while the second touch input is maintained, and to adjust the first location according to movement of the second touch input, such that movement of the adjusted location is less than the movement of the second touch input.

In accordance with another aspect of the present disclosure, a method for precise multi-touch input is provided. The method includes detecting a user input, determining a first location on a touchscreen of the electronic device based on the user input, detecting a touch input at a second location; and adjusting the first location according to movement of the second touch input, such that movement of the adjusted location is less than the movement of the second touch input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the present disclosure are provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality.

A smart home appliance may be, for example, a television, a Digital Video Disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Figure 1:
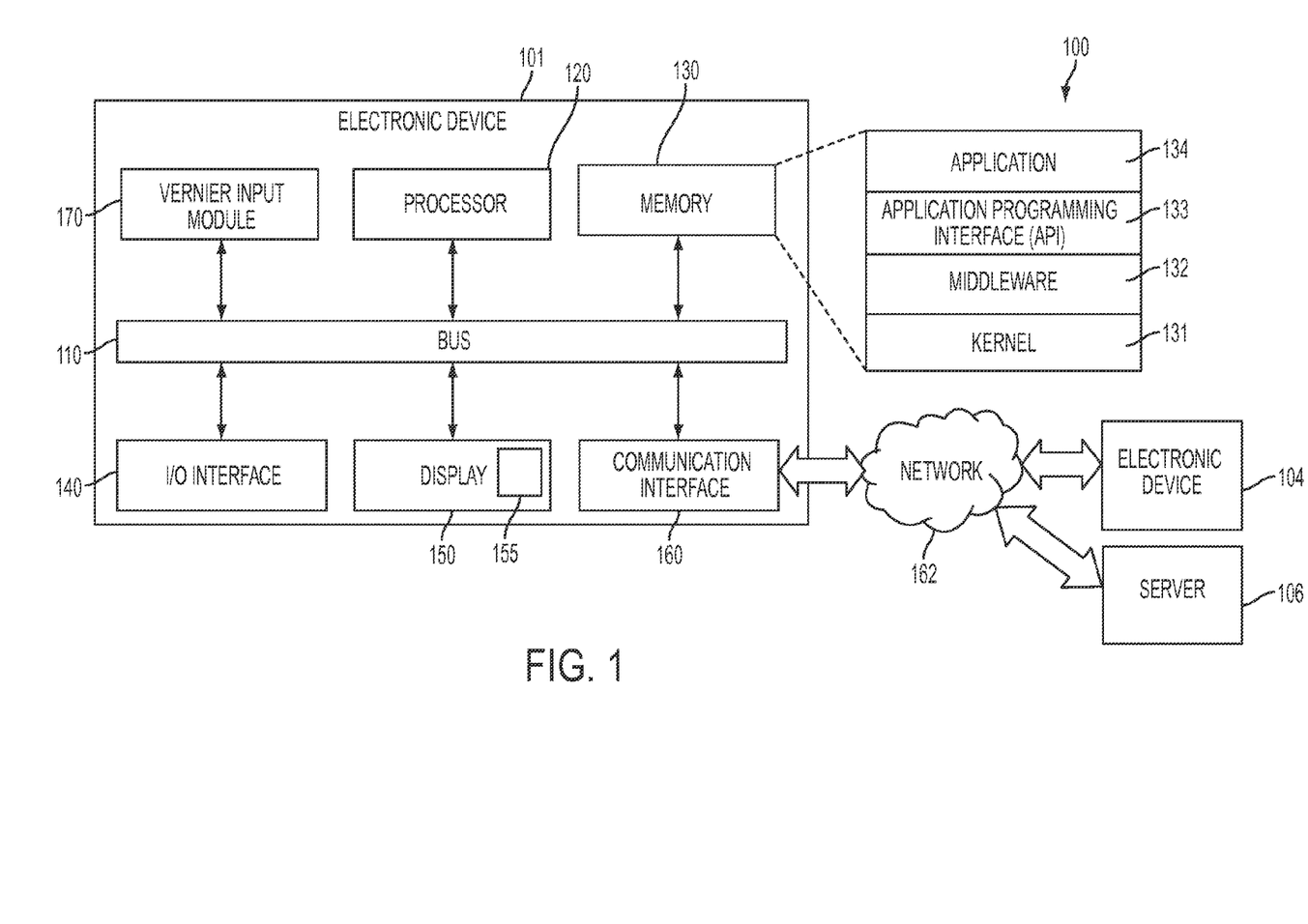
FIG. 1 illustrates a network environment including an electronic device according to various embodiments of the present disclosure.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a vernier input module 170, and/or the like.

The bus 110 may be circuitry that connects the foregoing components and allows communication between the foregoing components. For example, the bus 110 may connect components of the electronic device 101 so as to allow control messages and/or other information to be communicated between the connected components.

The processor 120 may receive instructions from other components (e.g., the memory 130, the I/O interface 140, the display 150, the communication interface 160, the vernier input module 170, and/or the like), interpret the received instructions, and execute computation or data processing according to the interpreted instructions.

The memory 130 may store instructions and/or data that are received from, and/or generated by, other components (e.g., the I/O interface 140, the display 150, the communication interface 160, the vernier input module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of the electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by the one or more applications 134 by assigning priorities for using system resources (e.g., the bus 110, the processor 120, the memory 130, and/or the like) of the electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

The application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., the electronic device 104).

The application 134 that is associated with the information exchange may include a notification relay application that may provide the external electronic device with a certain type of information, a device management application that may manage the external electronic device, and/or the like. The notification relay application may include a functionality that provides notification generated by other applications at the electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition, or as an alternative, the notification relay application may provide, for example, receive notification from an external electronic device (e.g., the electronic device 104), and may provide the notification to a user.

The device management application may manage enabling or disabling of functions associated with at least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

The application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may receive instruction and/or data from a user. The I/O interface 140 may send the instruction and/or the data, via the bus 110, to the processor 120, the memory 130, the communication interface 160, the vernier input module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the vernier input module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101. The display may also include a touchscreen module 155, as described below with respect to FIG. 2.

The communication interface 160 may provide communication between the electronic device 101 and one or more external electronic devices (e.g., the electronic device 104, the server 106, and/or the like). For example, the communication interface 160 may communicate with the external electronic devices by establishing a connection with a network 162 using wireless or wired communication. The wireless communication with which the communication interface 160 may communicate may be at least one of Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. The wired communication with which the communication interface 160 may communicate may be at least one of Universal Serial Bus (USB), High Definition Multimedia Interface (HDMI), Recommended Standard 232 (RS-232), Plain Old Telephone Service (POTS), Ethernet, and/or the like.

The network 162 may be a telecommunications network. The telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between the electronic device 101 and an external electronic device may be supported by, for example, at least one of the application 134, the API 133, the middleware 132, the kernel 131, the communication interface 160, and/or the like.

The vernier input module 170 provides a mechanism for precise input on a touch-screen. The vernier input module 170 is described below in more detail with respect to FIG. 2.

Figure 2:
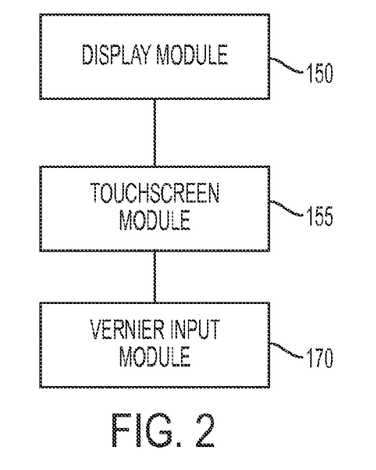
FIG. 2 illustrates components of an electronic device according to an embodiment of the present disclosure.

FIG. 2 illustrates components of an electronic device according to various embodiments of the present disclosure.

Referring to FIG. 2, the electronic device 101 may include the display 150, the touchscreen module 155, and the vernier input module 170, in addition to other components such as those shown in FIG. 1.

The touchscreen module 155 detects a touch input from the user and provides the input to the vernier input module 170 as well as other components of the electronic device, such as the processor 120. The touchscreen module 155 may detect touch input using capacitive, resistive, infrared, ultrasonic methods, and/or the like. The touchscreen module 155 may be formed as a capacitive touchscreen, resistive touchscreen, infrared touchscreen, and the like. Similarly, the touchscreen module 155 may be integrated with the display 150 or may be provided as a separate component arranged above or below the display 150. The touchscreen module 155 may take up all or only a part of the display 150.

The vernier input module 170 allows the user to perform more precise touch input using a multi-touch input. The user touches a general area of the screen where the user wishes to perform the input with one finger, and then touches another area of the screen with a second finger. When the first finger is removed, the vernier input module 170 records the location of the first finger, and then adjusts the first location according to the touch input from the second finger. However, the movement of the first location is scaled such that moving the second finger results in a smaller, more precise adjustment of the first location. For example, the first location could be adjusted by 10% of the movement of the second finger. Of course, other scaling factors may also be employed.

Moreover, while a finger is described as an input mechanism in the present disclosure, embodiments of the present disclosure are not limited to fingers as a touch input mechanism. A stylus may also be employed instead of or in addition to a finger. For example, the precise touch input could be performed by a combination of a stylus and a finger or by two styli.

An example of how the vernier input module 170 enables precise touch input is described below with respect to FIGS. 3A-3C.

Figure 3A:
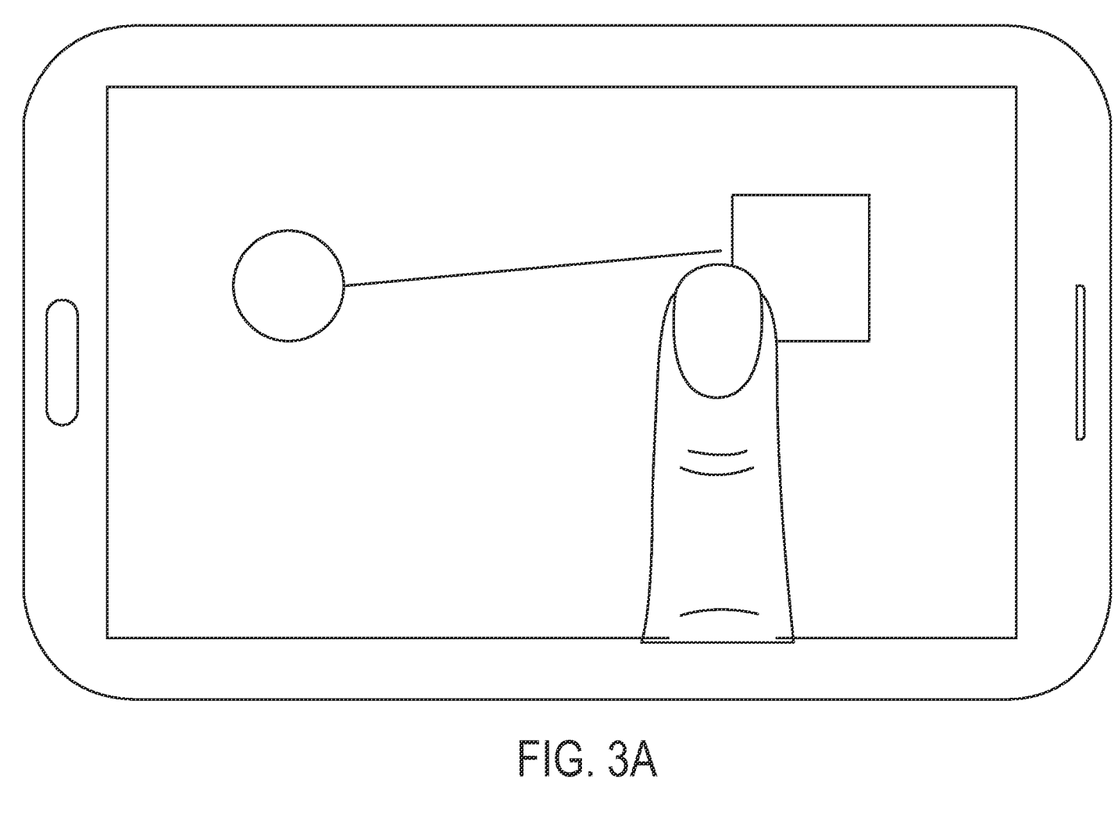
FIGS. 3A, 3B, and 3C illustrate a method of precise multi-touch input according to an embodiment of the present disclosure.
Figure 3B:
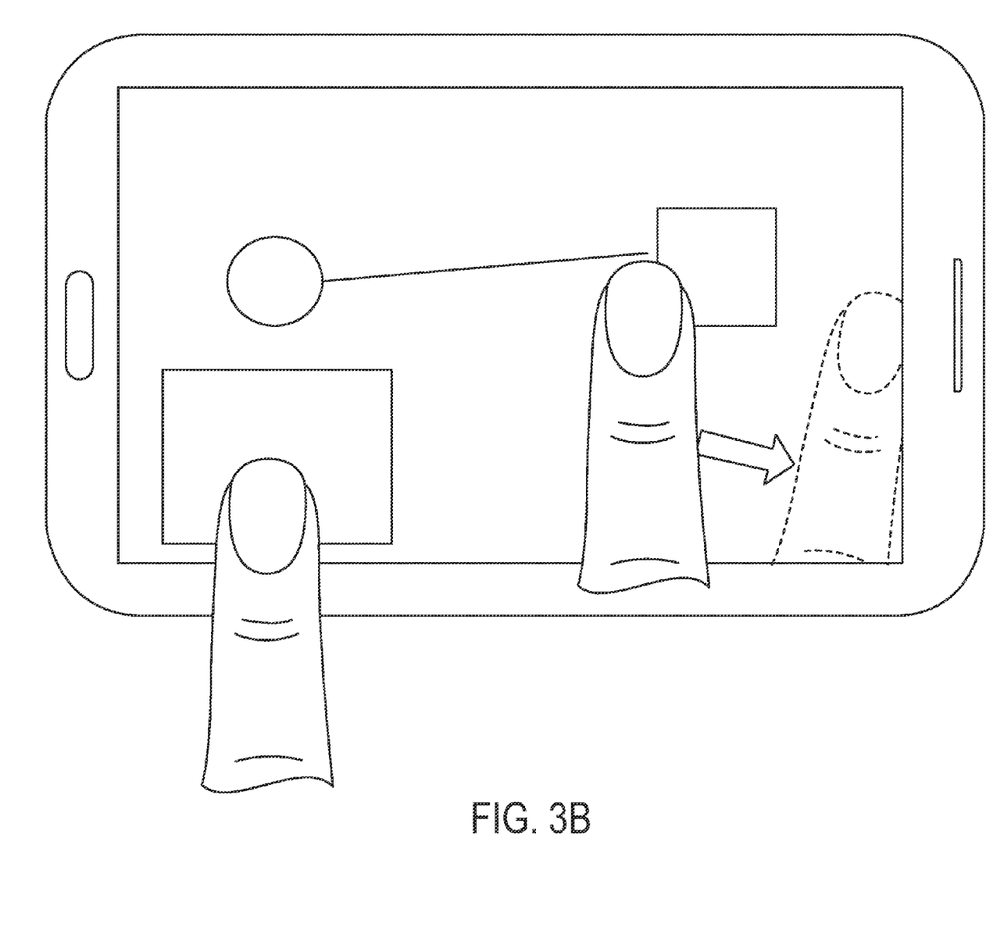
Figure 3C:
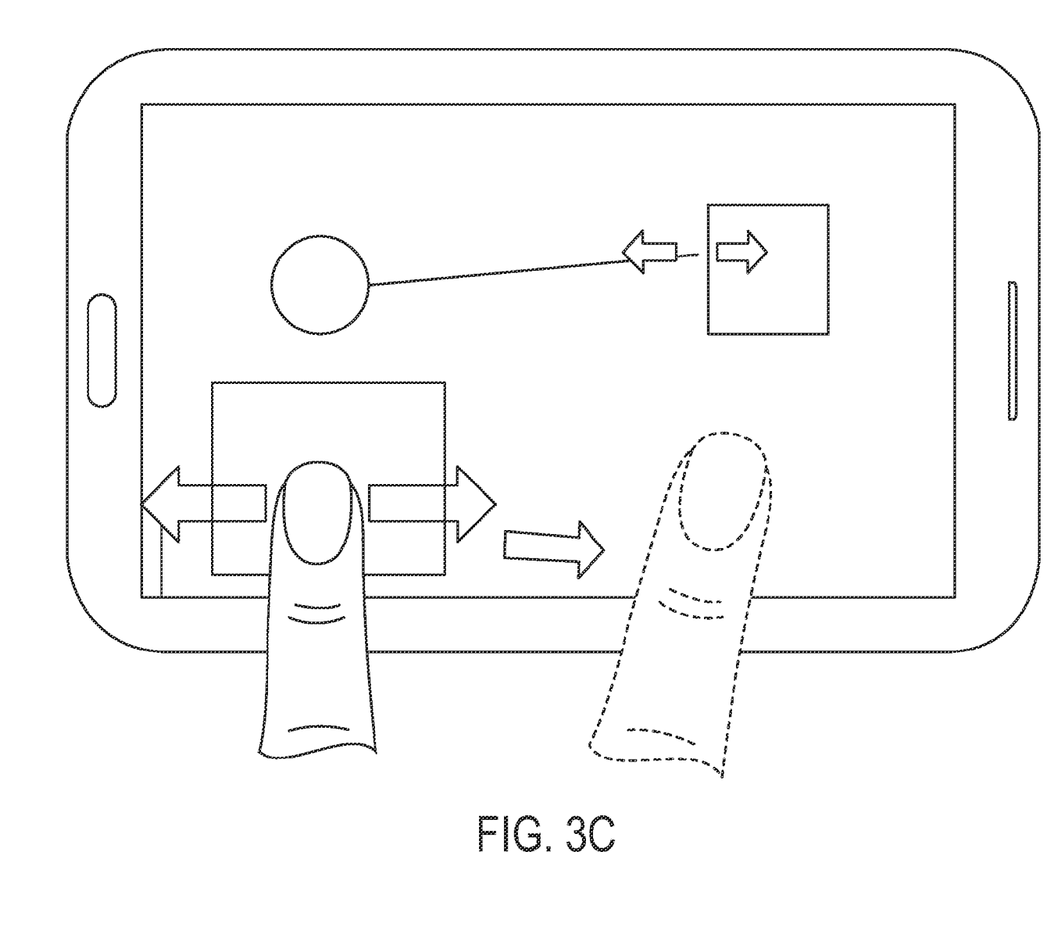

FIGS. 3A, 3B, and 3C illustrate a method of precise multi-touch input according to an embodiment of the present disclosure.

Referring to FIGS. 3A-3C, the user touches a first location, shown in FIG. 3A as a square. The first location may not be the precise point the user wishes to select, but the user is unable to place the touch input more precisely.

To allow precise input, the user touches a second location with a second touch input, as shown in FIG. 3B. This location may be a predefined location on the touchscreen display (e.g., a vernier input box), or may be any location sufficiently distant from the first location to prevent the movement of the user's finger at the second location from affecting the user's view of the first location.

Once the user has touched the second location, the user removes the touch input at the first location. The vernier input module 170 records the first location as the point touched by the first finger when the second touch input was detected. This allows the user to determine an approximate position for the first location, and then adjust that position more precisely via the second touch input and the vernier input module 170. According to another embodiment of the present disclosure, the vernier input module 170 may detect an object or interface element at the first location and select the object or interface element.

As shown in FIG. 3C, the user moves the second touch input at the second location to control precise adjustment of the first location. A movement of the second touch input (e.g., a stylus or the user's finger) at the second location results in a corresponding small movement at the first location. The vernier input module 170 controls the precise movement of the first location according to the second touch input at the second location. Once the user has determined the final position of the first location, the user may set this position by removing the touch input at the second location as shown in FIG. 3C, or, according to another embodiment of the present disclosure, touching the touchscreen module 155 at another location.

The vernier input module 170 may be used for a variety of operations and applications in which precise input is desired. Examples of applications where precise input may be useful include Computer Aided Drafting (CAD) applications, photo editing applications, and the like. However, the vernier input module 170 and associated method for precise touch input is not limited to these applications; nearly all applications may have a use for the precise input techniques described herein. For example, the vernier input module 170 may be used to select, scale, rotate, or copy an object. In a drawing application, the vernier input module 170 may be used to draw a line or a curve, or to create a rectangle or other shape. In a text application, browser, or E-book reader, the vernier input module 170 may be used to select a portion of text displayed on the screen. In a game, the vernier input module 170 may be used as part of an on-screen game controller, or in conjunction with an external game controller. The operations of the vernier input module 170 are described below with respect to FIGS. 4 and 5.

Figure 4:
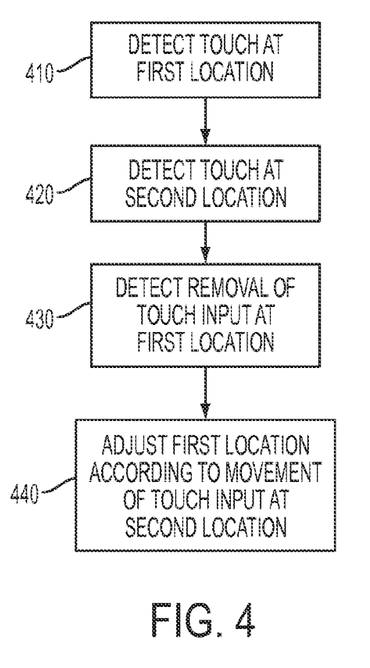
FIG. 4 illustrates a method of precise multi-touch input according to an embodiment of the present disclosure.

FIG. 4 illustrates a method of precise multi-touch input according to an embodiment of the present disclosure.

Referring to FIG. 4, the vernier input module 170 detects the user's touch input at a first location in operation 410. The touch input may be any type of touch input, such as a touch and hold or a touch and drag. Similarly, the touch input may be via any type of input device, such as a finger or a stylus, but is not limited thereto. According to an exemplary embodiment of the present disclosure, the touch input may be a multi-touch input, such as a pinch or zoom. According to another embodiment of the present disclosure, this input may be a non-touch input, such as a gesture, voice command, or action detected by a sensor of the electronic device 101 (such as an accelerometer). Examples of sensors that may be included in the electronic device 101 and used for this purpose are described below with respect to FIG. 6.

At operation 420, the vernier input module detects a touch at a second location. According to an exemplary embodiment of the present disclosure, the second location may be within a 'vernier rectangle' displayed on the display 150 and provided to allow precise multi-touch input. However, the vernier rectangle is not required and may be omitted. If the vernier rectangle is displayed, the vernier rectangle may be displayed on the display 150 in response to detecting the first touch input, when a particular user interface element is selected, or when a particular touch gesture is detected.

The vernier rectangle may be displayed in a variety of fashions. For example, the vernier rectangle may always be displayed in a fixed position, or could be placed by the user. The display of the vernier rectangle may also be controlled by user-configured settings, or may be changed by the user after the vernier rectangle is initially displayed. For example, hint boxes may be arranged to allow the user to adjust the size and position of the rectangle after the rectangle is initially displayed. When the vernier rectangle is placed by the user, the user may draw an outline of the vernier rectangle on the screen, and the outline may be used as the vernier rectangle. Similarly, the vernier rectangle may be displayed on a touchscreen of a connected external device, such as a touchpad, game controller, or other device having a touchscreen.

If the vernier rectangle is displayed on a touchscreen of an external device, the vernier rectangle may make up the entire display area of the external device, or may make up a portion of the screen. The various techniques for creating the second location may be applied similarly to the touchscreen of the external device.

The vernier rectangle may be displayed in an area of the display that does not conflict with the first location, or with the selected object or other interface element. For example, the vernier rectangle may be displayed in an area of the screen that does not overlap with the first location, selected object, or interface element. The size of the vernier rectangle may be determined based on the size of the target and features of the display, such as the display's pixel density.

If no input is detected within the vernier rectangle for a predetermined time, or if a touch input is detected outside the vernier rectangle, the vernier input module 170 may determine that no precise multi-touch input is necessary and process the first input according to normal operations.

At operation 430, the vernier input module 170 detects the removal of the first touch input. When the first touch input is removed, for example because the user has lifted the finger from the touchscreen module 155, the vernier input module records the location where the touch input was removed as the first location.

At operation 440, the vernier input module 170 adjusts the first location according to the touch input at the second location. A large movement at the second location will result in a comparatively smaller adjustment to the first location. For example, the adjustment of the first location may be 10% of the movement of the touch input at the second location. Larger or smaller scales may also be employed. The scale may also be non-linear.

When the touch input at the second location ends, the vernier input module 170 determines the final adjusted location of the first location. The vernier input module 170 passes the final adjusted location (e.g., coordinates of the final adjusted location) to the processor for further processing. The display 150 is updated according to the final adjusted location and any further processing by the processor and executing applications. At this time, the vernier input rectangle may be removed from the screen.

According to another embodiment of the present disclosure, the vernier input module 170 may determine the final adjusted location of the first location when another touch input is detected, in addition to the second touch input. For example, if a vernier rectangle is displayed, the additional touch input may be detected outside the vernier rectangle. In this situation, when the additional touch is detected, the vernier input module 170 determines the final adjusted location of the first location as being the adjusted location at the time when the additional input was detected. This may be useful when the user wants to perform a rapid series of edits or precise adjustments. While FIGS. 3B and 3C show the vernier input box as a rectangle, the shape of the vernier input box is not limited thereto, and may be any other shape or format.

When the vernier input module 170 determines the final adjusted location, the vernier input module 170 passes the final adjusted location to the processor for further processing. This may include forwarding the final adjusted location to the application controlling the first location (e.g., the application displaying the selected object, or the application responsible for the window or display area that includes the first location). The action taken by the processor may depend on the application currently running. For example, if the user is selecting a portion of text, the final adjusted location may be the final position of the cursor for selecting the text. If the user is drawing a line or curve in a drawing application, the final adjusted location may be the final position of the line or curve. In addition, this further processing may include status updates or error messages, depending on the nature of the application.

Figure 5:
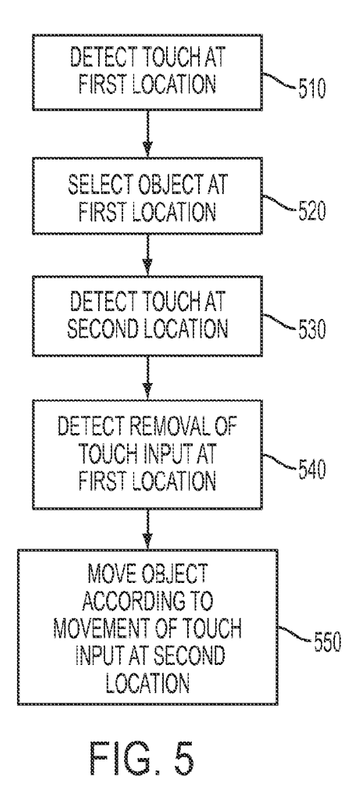
FIG. 5 illustrates a method of precise multi-touch input according to another embodiment of the present disclosure.

FIG. 5 illustrates a method of precise multi-touch input according to another embodiment of the present disclosure.

Referring to FIG. 5, the vernier input module 170 may be employed to select and move an object to a precise location determined by the user. At operation 510, the vernier input module 170 detects a touch input. At operation 520, the vernier input module 170 identifies an object at the first location and selects the identified object.

At operation 530, the vernier input module 170 detects a touch at a second location. The second location may be within a vernier input module, as described above, or may be in any location on the touchscreen module 155 other than the object selected at operation 520.

At operation 540, the vernier input module 170 detects the removal of the touch input at the first location. At operation 550, the vernier input module 170 adjusts the location of the selected object according to the movement of the second touch input at the second location. The adjustment of the selected object is less than the movement of the touch input at the second location; for example, the location of the selected object may be adjusted by 10% of the movement of the touch input at the second location. When the touch input at the second location is removed, a final adjusted location of the selected object is determined and the display 150 is updated based on the final adjusted location.

According to another embodiment of the present disclosure, the user may employ the vernier input module 170 to rotate the selected object. By moving the second touch input in a circular (e.g., clockwise or counter-clockwise), the user may rotate the selected object by a correspondingly smaller amount. In addition to rotation, the vernier input method may also be used to scale or copy the object, or to perform any other action on the object that may require precise positioning.

Figure 6:
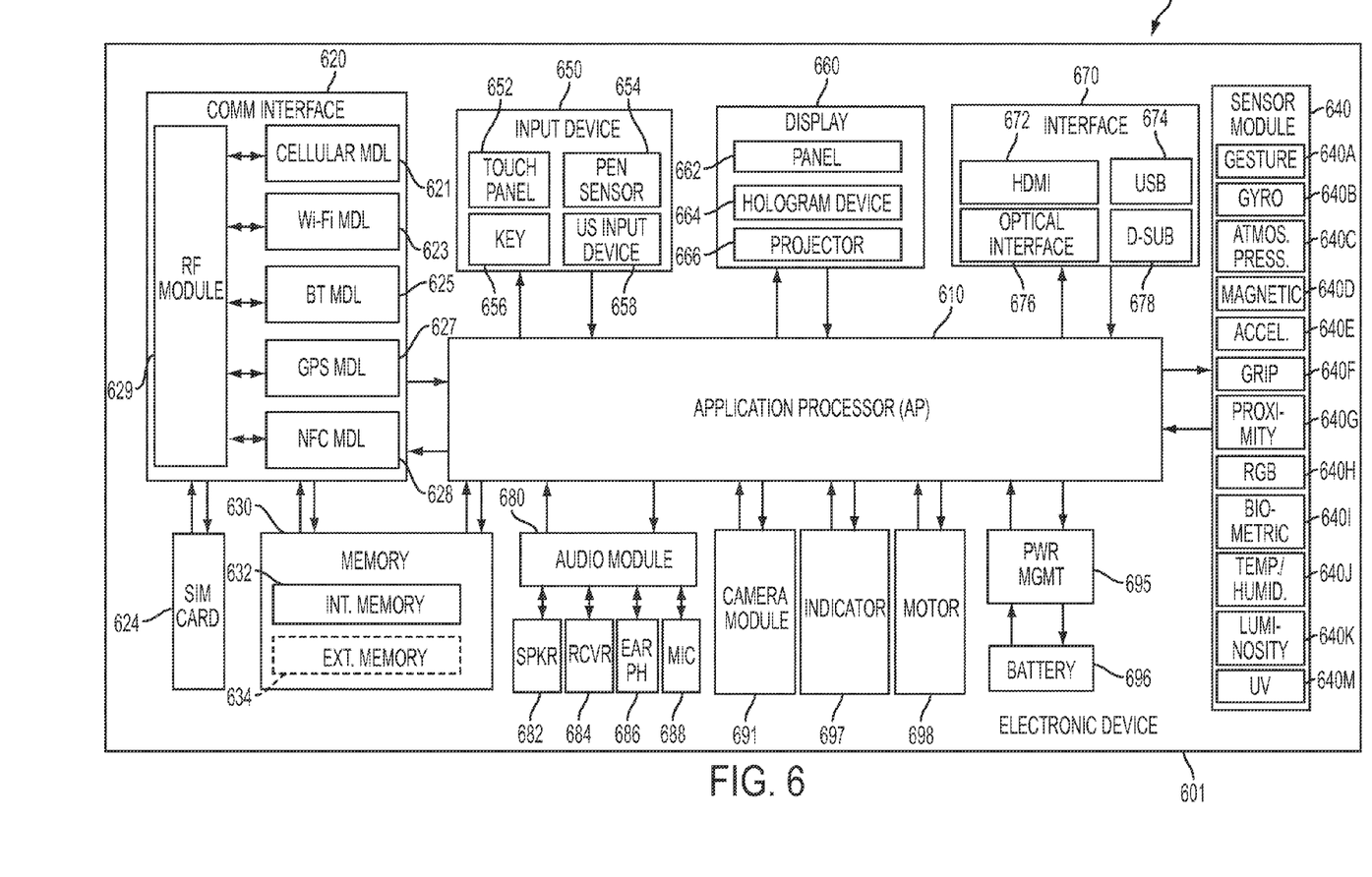
FIG. 6 illustrates a block diagram of hardware according to an embodiment of the present disclosure.

FIG. 6 illustrates a block diagram of hardware according to an embodiment of the present disclosure.

Referring to FIG. 6, an electronic device 601 may be, for example, a part or all of the electronic device 101. The electronic device 601 may include one or more Application Processors (AP) 610, a communication interface module 620, a Subscriber Identification Module (SIM) card 624, a memory 630, a sensor module 640, an input module 650, a display module 660, an interface 670, an audio module 680, a camera module 691, a power management module 695, a battery 696, an indicator 697, a motor 698, and/or the like.

The AP 610 may control one or more hardware or software components that are connected to AP 610, perform processing or computation of data (including multimedia data), and/or the like. As an example, the AP 610 may be implemented as a System-on-Chip (SoC). The AP 610 may include a Graphics Processing Unit (GPU) (not shown).

The communication interface module 620 (e.g., the communication interface 160) may transmit and receive data in communications between the electronic device 101 and other electronic devices (e.g., the electronic device 104, the server 106, and/or the like). The communication interface module 620 may include one or more of a cellular module 621, a Wi-Fi module 623, a Bluetooth module 625, a GPS module 627, a NFC module 628, a Radio Frequency (RF) module 629, and/or the like.

The cellular module 621 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). The cellular module 621 may differentiate and authorize electronic devices within a communication network using a Subscriber Identification Module (SIM) card (e.g., the SIM card 624). According to various embodiments of the present disclosure, the cellular module 621 may perform at least a part of the functionalities of the AP 610. For example, the cellular module 621 may perform at least a part of multimedia control functionality.

According to various embodiments of the present disclosure, the communication interface module 620 and/or the cellular module 621 may include a Communication Processor (CP). As an example, the cellular module 621 may be implemented as SoC.

Although FIG. 6 illustrates components such as the cellular module 621 (e.g., CP), the memory 630, the power management module 695 as components that are separate from the AP 610, according to various embodiments of the present disclosure, the AP 610 may include, or be integrated with, one or more of the foregoing components (e.g., the cellular module 621).

According to various embodiments of the present disclosure, the AP 610, the cellular module 621 (e.g., CP), and/or the like, may process instructions or data received from at least one of non-volatile memory or other components by loading in volatile memory. The AP 610, the cellular module 621, the communication interface module 620, and/or the like, may store at non-volatile memory at least one of data that is received from at least one of the other components or data that is generated by at least one of the other components.

The Wi-Fi module 623, the Bluetooth module 625, the GPS module 627, the NFC module 628, and/or the like may each include one or more processors that may process data received or transmitted by the respective modules. Although FIG. 6 illustrates the cellular module 621, the Wi-Fi module 623, the Bluetooth module 625, the GPS module 627, and the NFC module 628 as separate blocks, according to various embodiments of the present disclosure, any combination (e.g., two or more) of the cellular module 621, the Wi-Fi module 623, the Bluetooth module 625, the GPS module 627, the NFC module 628, and/or the like may be included in an Integrated Chip (IC) or an IC package. For example, at least some of the processors corresponding to the respective the cellular module 621, the Wi-Fi module 623, the Bluetooth module 625, the GPS module 627, the NFC module 628, and/or the like, may be implemented as a single SoC. For example, a CP corresponding to the cellular module 621 and a Wi-Fi processor corresponding to Wi-Fi module 623 may be implemented as a single SoC.

The RF module 629 may, for example, transmit and receive RF signals. Although not shown, the RF module 629 may include a transceiver, a Power Amp Module (PAM), a frequency filter, a Low Noise Amplifier (LNA), and/or the like. The RF module 629 may include one or more components for transmitting and receiving Electro-Magnetic (EM) waves (e.g., in free space or the like) such as, for example, conductors or conductive wires. Although FIG. 6 illustrates that the cellular module 621, the Wi-Fi module 623, the Bluetooth module 625, the GPS module 627, and the NFC module 628 are sharing one RF module 629, according to various embodiments of the present disclosure, at least one of the cellular module 621, the Wi-Fi module 623, the Bluetooth module 625, the GPS module 627, the NFC module 628, and/or the like may transmit and receive RF signals via a separate RF module.

The SIM card 624 may be a card implementing a SIM, and may be configured to be inserted into a slot disposed at a specified location of the electronic device. The SIM card 624 may include a unique identifier (e.g., Integrated Circuit Card IDentifier (ICCID)) subscriber information (e.g., International Mobile Subscriber Identity (IMSI)), and/or the like.

The memory 630 (e.g., memory 130) may include an internal memory 632, an external memory 634, or a combination thereof.

According to various embodiments of the present disclosure, the internal memory 632 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 632 may be a Solid State Drive (SSD). As an example, the external memory 634 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 634 may be operatively coupled to electronic device 601 via various interfaces. According to various embodiments of the present disclosure, the electronic device 601 may include recording devices (or recording media) such as, for example, Hard Disk Drives (HDD), and/or the like.

The sensor module 640 may measure physical/environmental properties detect operational states associated with electronic device 601, and/or the like, and convert the measured and/or detected information into signals such as, for example, electric signals or electromagnetic signals. As an example, the sensor module 640 may include at least one of a gesture sensor 640A, a gyro sensor 640B, an atmospheric pressure sensor 640C, a magnetic sensor 640D, an accelerometer 640E, a grip sensor 640F, a proximity sensor 640G, an RGB sensor 640H, a biometric sensor 640I, a temperature/humidity sensor 640J, a luminosity sensor 640K, a Ultra Violet (UV) sensor 640M, and/or the like. The sensor module 640 may detect the operation state of the electronic device and/or measure physical properties, and convert the detected or measured information into electrical signals. Additionally or alternatively, the sensor module 640 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 640 may also include control circuitry for controlling one or more sensors included therein.

The input module 650 may include a touch panel 652, a (digital) pen sensor 654, a key 656, an ultrasonic input device 658, and/or the like.

As an example, the touch panel 652 may detect touch input using capacitive, resistive, infrared, ultrasonic methods, and/or the like. The touch panel 652 may also include a touch panel controller (not shown). As an example, a capacitive-type touch panel may detect proximity inputs (e.g. hovering input) in addition to, or as an alternative to, physical touch inputs. The touch panel 652 may also include a tactile layer. According to various embodiments of the present disclosure, the touch panel 652 may provide haptic (or other) feedback to the user using the tactile layer.

As an example, the (digital) pen sensor 654 may be implemented using methods identical to or similar to receiving a touch input from a user, or using a separate detection sheet (e.g., a digitizer).

As an example, the key 656 may be a keypad, a touch key, and/or the like.

As an example, the ultrasonic input device 658 may be a device configured to identify data by detecting, using a microphone (e.g., microphone 688), ultrasonic signals generated by a device capable of generating the ultrasonic signal. The ultrasonic input device 658 may detect data wirelessly.

According to various embodiments of the present disclosure, the electronic device 601 may receive user input from an external device (e.g., a network, computer or server) connected to the electronic device 601 using the communication interface module 620.

The display module 660 (e.g., the display 150) may include a panel 662, a hologram device 664, a projector 666, and/or the like. As an example, the panel 662 may be, for example, a Liquid-Crystal Display (LCD), an Active-Matrix Organic Light-Emitting Diode (AM-OLED) display, and/or the like. As an example, the panel 662 may be configured to be flexible, transparent, and/or wearable. The panel 662 and the touch panel 652 may be implemented as a single module. The hologram device 664 may provide a three-dimensional image. For example, the hologram device 664 may utilize the interference of light waves to provide a three-dimensional image in empty space. The projector 666 may provide image by projecting light on a surface (e.g., a wall, a screen, and/or the like). As an example, the surface may be positioned internal or external to electronic device 601. According to various embodiments of the present disclosure, the display module 660 may also include a control circuitry for controlling the panel 662, the hologram device 664, the projector 666, and/or the like.

The interface 670 may include, for example, one or more interfaces for a High-Definition Multimedia Interface (HDMI) 672, a Universal Serial Bus (USB) 674, a projector 676, or a D-subminiature (D-sub) 678, and/or the like. The interface 670 may be part of the communication interface module 620. Additionally or alternatively, the interface 670 may include one or more interfaces for Mobile High-definition Link (MHL), Secure Digital (SD)/MultiMedia Card (MMC), Infrared Data Association (IrDA), and/or the like.

The audio module 680 may encode/decode sound into electrical signal, and vice versa. According to various embodiments of the present disclosure, at least a portion of the audio module 680 may be part of the I/O interface 140. As an example, the audio module 680 may encode/decode voice information that is input into, or output from, a speaker 682, a receiver 684, an earphone 686, the microphone 688, and/or the like.

The camera module 691 may capture still images and/or video. According to various embodiments of the present disclosure, the camera module 691 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 695 may manage electrical power of the electronic device 601. Although not shown, the power management module 695 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 601 may include wired or wireless charging. The charger IC may charge a battery, may prevent excessive voltage or excessive current from a charger from entering the electronic device 601, and/or the like.

According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

The battery gauge may measure a charge level, a voltage while charging, a temperature of the battery 696, and/or the like.

The battery 696 may supply power to the electronic device 601. The battery 696 may be a rechargeable battery, a solar battery, and/or the like.

The indicator 697 may indicate one or more states (e.g., boot status, message status, charge status, and/or the like) of the electronic device 601 or a portion thereof (e.g., the AP 610). The motor 698 may convert an electrical signal into a mechanical vibration.

Although not shown, the electronic device 601 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are not intended to limit the scope of the present disclosure. Accordingly, the scope of the present disclosure should be understood as to include any and all modifications that may be made without departing from the technical spirit of the present disclosure.

What is claimed is:

1. A method for precise multi-touch input, the method comprising:
   detecting, on a touchscreen, a first touch input at an approximate position of a first location;
   displaying, in response to the first touch input, an input area on the touchscreen arranged so as not to overlap the location of the first touch input;
   while the first touch input is maintained, detecting a second touch input at a second location within the displayed input area on the touchscreen;
   detecting removal of the first touch input at the first location while the second touch input is maintained; and
   adjusting the first location according to movement of the second touch input, such that the adjustment is less than and scaled to the movement of the second touch input,
   wherein the second location is any location sufficiently distant from the first location to prevent the movement of a finger associated with the second touch input at the second location from affecting a view of the first location.

2. The method of claim 1, further comprising:
   determining a precise position of the first location when a third touch input is detected at a location of the touchscreen outside of the input area.

3. The method of claim 1, further comprising:
   determining a precise position of the first location when the second touch input is no longer detected in the input area.

4. The method of claim 1, further comprising:
   stopping the display of the input area after the adjusting of the first location is completed.

5. The method of claim 1, wherein a size of the input area is determined according to a pixel density of the touchscreen.

6. The method of claim 1, wherein the displaying of the input area comprises:
   receiving a user selection of an area on the touchscreen; and
   displaying the input area as enclosing the area selected by the user.

7. The method of claim 1, further comprising:
   detecting an object displayed on the touchscreen at the first location; and
   selecting the detected object.

8. The method of claim 7, wherein the adjusting of the first location comprises adjusting a position of the object according to the movement of the second touch input, such that the adjusted position of the object is less than and scaled to the movement of the second touch input.

9. The method of claim 7, wherein the adjusting of the first location comprises:
   rotating the object according to a rotation of the second touch input, such that the adjusted rotation of the object is less than and scaled to the rotation of the second touch input.

10. The method of claim 7, further comprising:
    when a precise position of the first location is determined, displaying a copy of the selected object at the final adjusted location.

11. The method of claim 1, further comprising:
    determining a precise position of the first location when the second touch input is no longer detected.

12. The method of claim 1, further comprising:
    determining a precise position of the first location when a third input is detected on the touchscreen.

13. An apparatus configured to provide a precise multi-touch input, the apparatus comprising:
    a display;
    a touchscreen operatively coupled to the display and configured to detect a touch; and
    a processor configured to:
       detect, on a touchscreen, a first touch input at an approximate position of a first location,
       in response to detecting the first touch input, control the display to display an input area arranged so as not to overlap the location of the first touch input,
       detect a second touch input at a second location within the input area on the touchscreen while the first touch input is maintained,
       detect removal of the first touch input at the first location while the second touch input is maintained, and
       adjust the first location according to movement of the second touch input, such that the adjustment is less than and scaled to the movement of the second touch input,
    wherein the second location is any location sufficiently distant from the first location to prevent the movement of a finger associated with the second touch input at the second location from affecting a view of the first location.

14. The apparatus of claim 13, wherein the processor is further configured to determine a precise position of the first location when a third touch input is detected at a location of the touchscreen outside of the input area.

15. The apparatus of claim 13, wherein the processor is further configured to determine a precise position of the first location when the second touch input is no longer detected in the input area.

16. The apparatus of claim 13, wherein the processor is further configured to stop the display of the input area on the touchscreen after the adjusting of the first location is completed.

17. The apparatus of claim 13, wherein the processor is further configured to determine a size of the input area according to a pixel density of the touchscreen.

18. The apparatus of claim 13, wherein the processor is further configured to:
    detect a user selection of an area on the touchscreen, and
    display the input area as enclosing the area selected by the user.

19. The apparatus of claim 13, wherein the processor is further configured to:
    detect an object displayed on the touchscreen at the first location, and
    adjust a position of the object according to the movement of the second touch input, such that the adjusted position of the object is scaled to and less than the movement of the second touch input.

20. The apparatus of claim 13, wherein the processor is further configured to determine a precise position of the first location when the second touch input is no longer detected.

21. The apparatus of claim 13, wherein the processor is further configured to determine a precise position of the first location when a third input is detected.

22. The apparatus of claim 13, wherein the processor is further configured to:
    detect an object displayed on the touchscreen at the first location, and rotate the object according to the movement of the second touch input, such that the rotation of the object is less than and scaled to the movement of the second touch input.

23. The apparatus of claim 13, wherein the processor is further configured to:
  detect an object displayed on the touchscreen at the first location, and
  change a size of the object according to the movement of the second touch input, such that the change in size of the object is less than and scaled to the movement of the second touch input.

\* \* \* \* \*